June 12, 1951  H. A. STRICKLAND, JR  2,556,236
HEAT TREATING METHOD AND PRODUCT
Filed Aug. 31, 1946
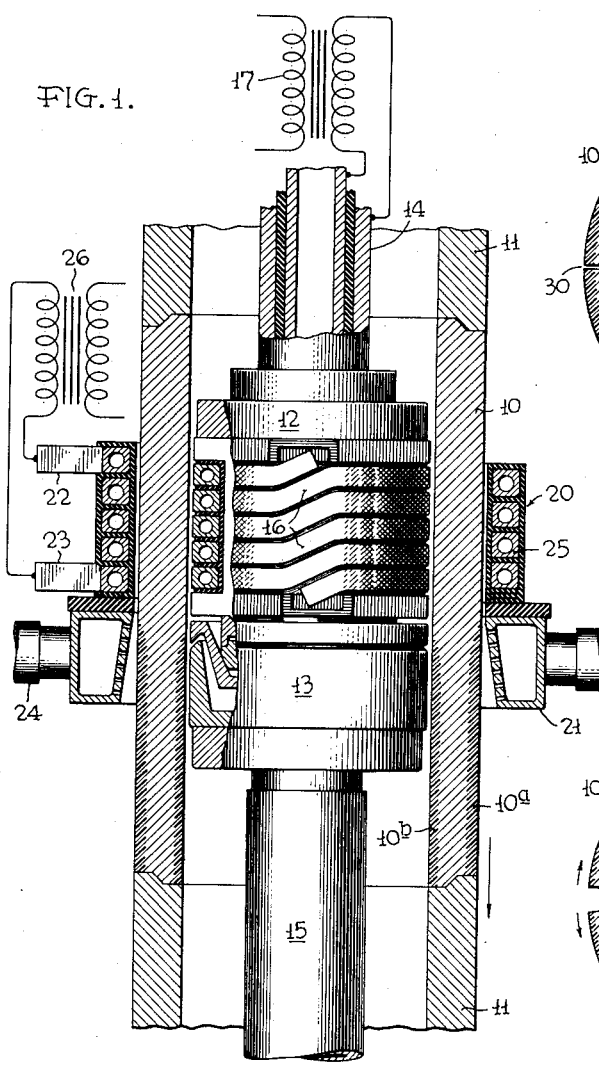
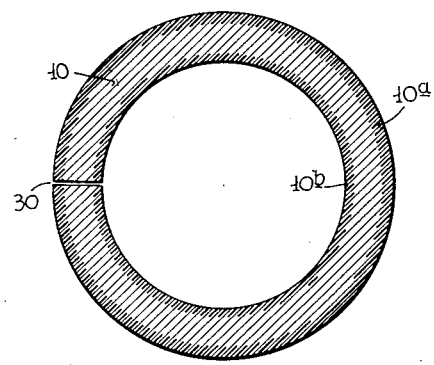
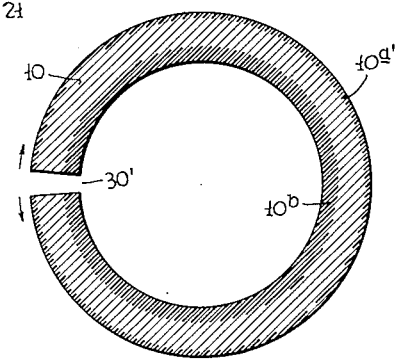
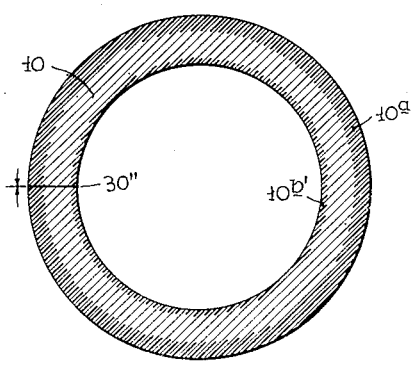
*INVENTOR*
Harold A. Strickland, Jr.
BY
*ATTORNEY*

Patented June 12, 1951

2,556,236

UNITED STATES PATENT OFFICE 2,556,236

HEAT-TREATING METHOD AND PRODUCT

Harold A. Strickland, Jr., Detroit, Mich., assignor, by mesne assignments, to The Ohio Crankshaft Company, Cleveland, Ohio, a corporation of Ohio Application August 31, 1946, Serial No. 694,335

7 Claims. (Cl. 148—31)

This invention relates to the heat treatment of pipes or tubes and has for an object the provision of improvements in this art.

In accordance with the invention, there is provided a method of hardening the inner and outer surfaces of the wall of a cylindrical bushing member formed of a high-carbon, quench-hardenable steel which comprises generally simultaneously inducing alternating currents to flow in a circumferential direction in a short axial portion of both of the surfaces for such a limited length of time and of such a high frequency and power density that only a surface layer of the axial portion of each surface is heated above the quench-hardening temperature for the particular steel employed and the portions intermediate the layer remain below the quench-hardening temperature, progressively moving the portion of induced current flow along the axial length of the member and then generally simultaneously and immediately quenching the short axial lengths of the heated surfaces as they become progressively heated to the quench-hardening temperature.

Also, in accordance with the present invention, there is provided a tube of a high-carbon steel having a wall, the inside and outside diameter surfaces of the wall having hardened layers, the layers having internal compressive stresses caused by the hardening operation, the layer at the outside surface being of a greater depth than the layer of the inside surface, the ratio of depth of the outside layer to the inside layer being approximately 4 to 3.

One of the particular objects is to heat treat a pipe in such manner as to balance the inside and outside residual stresses and leave the pipe in a neutral stress condition to avoid distortion.

Another object is to heat treat both sides simultaneously to avoid spalling and drawing of hardness characteristic of successive heat treatments.

The above and other objects and advantages will be apparent from the following description of an exemplary embodiment of the invention, reference being made to the accompanying drawings, wherein:

Fig. 1 is a sectional view of apparatus for simultaneously heat-treating the inside and outside surfaces of a tube by electro-magnetic inductive heating followed by quenching;

Fig. 2 is a section through a tube which has been heat-treated according to the present method and cut through on one radius;

Fig. 3 is a section through a cut tube which has been excessively heat-treated on the inside as compared to the outside; and Fig. 4 is a section through a cut tube which has been excessively heat-treated on the outside as compared to the inside.

When a tube is heat-treated to harden it, as when a ferrous tube is heated by electro-magnetic induction and fluid quenched, it has residual compressive stresses on the side which has been hardened tending to distort it.

I have discovered that if both sides of a pipe are hardened simultaneously there is no tendency to draw the hardness from either side and that spalling is avoided; also that by hardening the tube to a greater depth on the outside than on the inside the stresses are balanced or neutralized and the tendency to distort is avoided. I have found that the ratio of depth of hardening respectively on the outside and inside for a balanced stress condition is established at about four to three.

In the exemplary embodiment of apparatus for practicing the invention the workpiece or tube 10 to be heat-treated is accurately held in position by holding rings 11 of a non-hardenable material, such for example as low carbon steel. The holding rings are parts of a heat-treating machine which provides for relative reciprocation and rotation of the workpiece with respect to the heat-treating means but the invention may be understood without illustrating the whole machine.

The workpiece is of uniform chemical composition throughout, both before and after heat-treatment and is of a material, such for example as high carbon steel, which is adapted to be hardened by electromagnetic induction heating and quench cooling.

The tubular workpiece is heat treated simultaneously on the inside and outside surfaces. On the inside an induction heating head 12 and a quench head 13 are provided, these being carried on mandrels 14, 15 which hold them accurately in position, provide relative reciprocation and rotation with respect to the workpiece, and supply quench fluid and electric current. Also, they provide cooling fluid for the hollow coils 16 of the heating head. The means for supplying current is represented by the transformer 17.

On the outside an induction heating head 20 and a quench head 21 are provided, these being carried on suitable supports 22, 23 and 24 which hold them accurately in position, provide relative reciprocation and rotation with respect to the workpiece, and supply quench fluid and electric current. Also, they provide cooling fluid for the hollow coils 25 of the heating head. The means for supplying current is represented by the transformer 26.

The heating coils 16 and 20 and the quench heads 13 and 21 are paired respectively and have relative longitudinal movement with respect to the axis of the workpiece. They heat the tube in a common transverse zone on inside and outside and quench in another common transverse zone on inside and outside, as shown in Fig. 1. This prevents spalling and drawing of hardness from an already hardened surface when the opposite surface is hardened.

In order further to avoid latent forces of distortion it is necessary to harden the wall to a greater depth from the outside than from the inside. This is shown in the section of Fig. 2 where the outer hardened zone or layer 10a bears about a 4 to 3 depth or thickness relation to the inner zone or layer 10b. When a saw cut 30 is made on one radius it is found that the tube does not substantially change its shape. That is, it neither expands nor contracts and the ends on the sides of the saw cut neither separate nor close up.

In Fig. 3, where the outside has been hardened to less than the optimum depth relative to the inside, as at 10a', the tube opens up, as at 30', when sawed through on a radius. The relative thicknesses are exaggerated here for clarity.

In Fig. 4, where the inside has been hardened to less than the optimum depth relative to the outside, as at 10b', the tube closes up, as at 30" when sawed through on a radius. Here again the thickness relationship has been exaggerated for illustrative clarity.

The simultaneous heat treatment has been found to prevent spalling and the drawing of hardness from a hardened side which upset prior attempts to provide a satisfactory tube which was hardened on both its ID and OD. The fact that the tube is of uniform size at any section along the axis of travel of the heat treating elements assists in producing a dependable uniform product. Where there are adjacent connected sections of different size or which are not treated it is difficult to provide this uniform product of predetermined characteristics.

In addition to dependability and uniformity this method is also rapid and economical.

One embodiment of the invention has been illustrated by way of example, but it is to be understood that there may be various embodiments within the limits of the prior art and the scope of the subjoined claims.

What is claimed is:

1. A tube of a high-carbon steel having a wall, the inside and outside diameter surfaces of the wall having hardened layers, said layers having internal compressive stresses caused by the hardening operation, the layer at the outside surface being of a greater depth than the layer of the inside surface, the ratio of depth of the outside layer to the inside layer being approximately four to three.

2. The method of hardening the inner and outer surfaces of the wall of a cylindrical bushing member formed of a high-carbon quench-hardenable steel which comprises generally simultaneously inducing alternating currents to flow in a circumferential direction in both of said surfaces for such a limited length of time and of such a high frequency and power density that only a surface layer of each surface is heated above the quench-hardening temperature for the particular steel employed and the portions intermediate the layers remain below said temperature, and then generally simultaneously and immediately quenching both of said heated surfaces.

3. The method of hardening the inner and outer surfaces of the wall of a cylindrical bushing member formed of a high-carbon quench-hardenable steel which comprises generally simultaneously directly heating each of said surfaces at a rate greater than said steel can conduct heat inwardly into the portion of said wall intermediate said surfaces so that only surface layers of said inner and outer surfaces are raised to a temperature in excess of the quench-hardening temperature of the particular steel employed and the intermediate portion remains below said temperature; and, after said layers have reached and before said intermediate portion reaches said temperature, generally immediately and simultaneously quenching each surface.

4. The method of hardening the inner and outer surfaces of the wall of a cylindrical bushing member formed of a high-carbon quench-hardenable steel which comprises disposing a first high-frequency inducing coil on the inside of said member and a second high-frequency inducing coil around the outside of said member directly opposite said first coil, simultaneously flowing alternating currents in both of said coils of such a high-frequency as to induce high-frequency currents to flow only in the surface layers of each surface, of such a power density that the currents will heat the surface layers above the quench-hardening temperature for the particular steel employed before sufficient heat is conducted through the metal to the portions intermediate the layers to raise the said portions above the said temperature, and for such a limited length of time that only the surface layers of each surface are heated above the said temperature and the portions intermediate the layers remain below the said temperature, and then generally simultaneously and immediately quenching both of said surfaces.

5. The method of hardening the inner and outer surfaces of the wall of a cylindrical bushing member formed of a high-carbon quench-hardenable steel which comprises generally simultaneously inducing alternating currents to flow in a circumferential direction in a short axial portion of both said surfaces for such a limited length of time and of such a high frequency and power density that only a surface layer of the axial portion of each surface is heated above the quench-hardening temperature for the particular steel employed and the portions intermediate the layers remain below said temperature, progressively moving the portion of induced current flow along the axial length of the member and then generally simultaneously and immediately quenching the short axial lengths of said heated surfaces as they become progressively heated to the quench-hardening temperature.

6. The method of hardening the inner and outer surfaces of the wall of a cylindrical bushing member formed of a high-carbon quench-hardenable steel which comprises disposing a first high-frequency inducing coil on the inside of said member and a second high-frequency inducing coil around the outside of said member directly opposite said first coil, both of said coils having an axial length considerably less than the axial length of said member, simultaneously flowing alternating currents in both of said coils of such a high-frequency as to induce high-frequency currents to flow only in short axial lengths in the surface layers of each surface of such a power density that the currents will heat short axial lengths only of the surface layers above the quench-hardening temperature for the particular steel employed before sufficient heat is conducted through the metal to the portions intermediate the layers to raise the said portions above the said temperature and for such a limited length of time that only the surface layers of each surface are heated above the said temperature and the portions intermediate the layers remain below the said temperature, axially progressing said coils along the length of said member to progressively heat a continuous surface over a substantial length of said member and generally simultaneously and immediately progressively quenching the short heated lengths of both of said surfaces.

7. The method of claim 2 wherein the density of current flow in the outer surface is greater than the density in the inner surface whereby the outer surface will be hardened to a greater extent than the inner surface and the locked-in compressive hardening stresses of the outer surface will tend to be greater than the locked-in compressive hardening stresses of the inner surface and the bending moments of the locked-in stresses will tend to be equal and opposite.

HAROLD A. STRICKLAND, Jr.

REFERENCES CITED

The following references are of record in the file of this patent:

UNITED STATES PATENTS

| Number | Name | Date |
|---|---|---|
| 1,401,983 | Hultgren | Jan. 3, 1922 |
| 2,067,549 | Sykes | Jan. 12, 1937 |
| 2,254,913 | Roth | Sept. 2, 1941 |
| 2,295,272 | Somes | Sept. 8, 1942 |
| 2,316,110 | Somes | Apr. 6, 1943 |

OTHER REFERENCES

"Transactions of A. S. M.," March 1939, pages 43–54, especially page 52.